United States Patent
Iseli et al.

(10) Patent No.: US 10,775,147 B2
(45) Date of Patent: Sep. 15, 2020

(54) NON-CARTESIAN HEXAPOD OR HEXAPOD-LIKE COORDINATE MEASURING MACHINE

(71) Applicant: HEXAGON TECHNOLOGY CENTER GMBH, Heerbrugg (CH)

(72) Inventors: Claudio Iseli, Au (CH); Bernhard Sprenger, Widnau (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 120 days.

(21) Appl. No.: 16/118,842

(22) Filed: Aug. 31, 2018

(65) Prior Publication Data
US 2019/0072373 A1    Mar. 7, 2019

(30) Foreign Application Priority Data
Sep. 1, 2017 (EP) ..................................... 17189077

(51) Int. Cl.
*G01B 5/004*    (2006.01)
*G01B 5/00*    (2006.01)
(Continued)

(52) U.S. Cl.
CPC ........... *G01B 5/0004* (2013.01); *G01B 5/008* (2013.01); *G01B 21/047* (2013.01)

(58) Field of Classification Search
CPC .................................................. G01B 5/0004
(Continued)

(56) References Cited

U.S. PATENT DOCUMENTS 5,028,180 A * 7/1991 Sheldon ............... B23Q 1/5462
248/631
5,604,593 A   2/1997 McMurtry
(Continued)

FOREIGN PATENT DOCUMENTS

CN    1449476 A    10/2003
CN    1176306 C    11/2004
(Continued)

OTHER PUBLICATIONS

Extended European Search Report dated Feb. 2, 2018 as received in Application No. 17189077.5.
(Continued)

*Primary Examiner* — George B Bennett
(74) *Attorney, Agent, or Firm* — Maschoff Brennan (57) ABSTRACT

A hexapod CMM or hexapod-like CMM has a base structure and a movable structure connected to each other by at least three telescopically extendable legs via spherical joints. Each of the telescopically extendable legs comprises a linear first member and a linear second member having countersliding surfaces and are designed in such a way that allows a relative, linear movement of the first linear member and the second linear member. Further each of the telescopically extendable legs has an air cushioning mechanism, which comprises at least one air supply system connected to at least one source of compressed air and having at least one air escape. The air escape is arranged in such a way that compressed air escaping the air escape flows into a gap between the countersliding surfaces of the at least two linear members of the leg cushioning the two linear members against each other.

17 Claims, 7 Drawing Sheets

(51) Int. Cl.
*G01B 5/008* (2006.01)
*G01B 21/04* (2006.01)

(58) Field of Classification Search
USPC .......................................................... 33/503
See application file for complete search history.

(56) References Cited

U.S. PATENT DOCUMENTS

| | | | |
|---|---|---|---|
| 5,870,834 A * | 2/1999 | Sheldon | G01B 5/004 |
| | | | 33/502 |
| 5,909,939 A | 6/1999 | Fugmann | |
| 6,211,960 B1 | 4/2001 | Hembree | |
| 6,607,157 B1 | 8/2003 | Duescher | |
| 6,836,323 B2 * | 12/2004 | Schmadel | G01B 21/042 |
| | | | 33/502 |
| 7,386,408 B2 * | 6/2008 | Nishibashi | B25J 9/1623 |
| | | | 33/502 |
| 7,841,097 B2 | 11/2010 | Evans et al. | |
| 2003/0070311 A1 * | 4/2003 | Zhu | G01B 21/042 |
| | | | 33/502 |
| 2003/0106230 A1 * | 6/2003 | Hennessey | B25J 17/0216 |
| | | | 33/645 |
| 2009/0260243 A1 * | 10/2009 | Evans | G01B 21/04 |
| | | | 33/502 |
| 2010/0058602 A1 * | 3/2010 | McMurtry | G01B 5/008 |
| | | | 33/503 |
| 2019/0145748 A1 * | 5/2019 | Angood | B25J 9/0066 |
| | | | 33/503 |

FOREIGN PATENT DOCUMENTS

| | | |
|---|---|---|
| CN | 103260914 A | 8/2013 |
| CN | 103260914 B | 8/2016 |
| DE | 10119616 A1 | 10/2002 |
| WO | 2002/027205 A1 | 4/2002 |
| WO | 2012/079689 A1 | 6/2012 |

OTHER PUBLICATIONS

Kuiper, S., et al., "Large dynamic range Atomic Force Microscope for overlay improvements," Proceedings of SPIE—The International Society for Optical Engineering, vol. 9778, pp. 97781B-1-97781B-10 (Mar. 8, 2016).

* cited by examiner

NON-CARTESIAN HEXAPOD OR HEXAPOD-LIKE COORDINATE MEASURING MACHINE

CROSS-REFERENCE TO RELATED APPLICATIONS

This application claims priority to European Patent Application No. 17189077.5 filed on Sep. 1, 2017, which is incorporated herein by reference.

FIELD OF THE INVENTION

The present invention relates to a Coordinate Measuring Machine (short CMM), in particular to a non-Cartesian Coordinate Measuring Machine (short NCCMM), wherein the functionally of this NCCMM is based on the principals of a hexapod structure, so that this Coordinate Measuring Machine is also called a hexapod CMM or a hexapod-like CMM.

BACKGROUND

Figure 1:
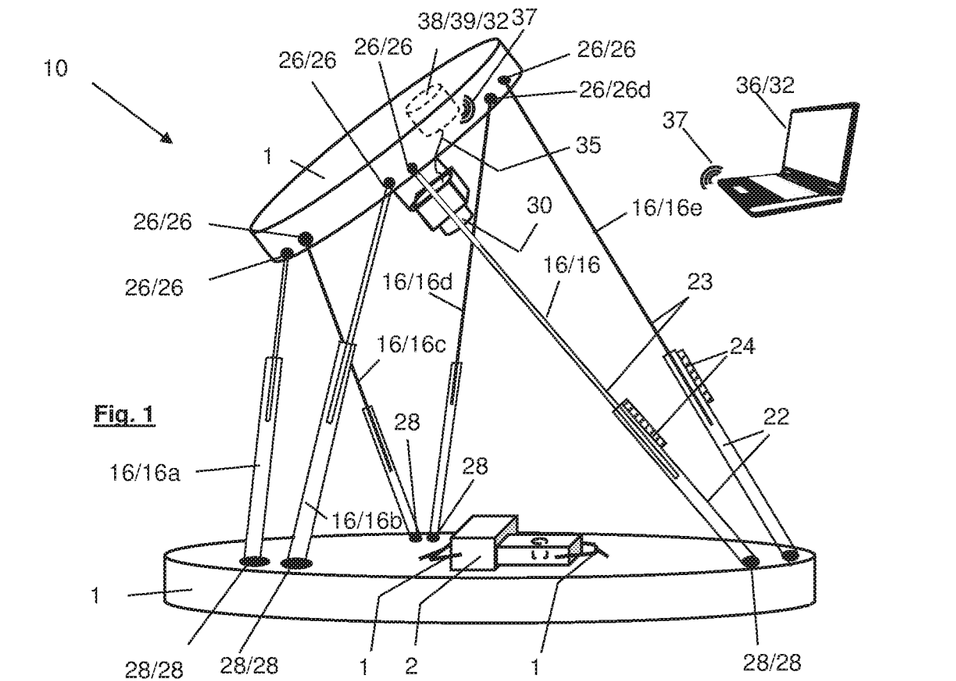
FIG. 1 an example for a Non Cartesian CMM in form of a typical hexapod CMM with six extendable legs.

The basic principal of a hexapod CMM 10 is presented on the bases of FIG. 1. In principal a hexapod CMM comprises a base structure 12 and a moveable structure 14 that are spaced apart by usually six telescopically extendable legs 16 (16a, 16b, 16c, 16d, 16e, 16f). Usually the six telescopically extendable legs 16 (16a, 16b, 16c, 16d, 16e, 16f) are connected with their bottom ends to the base structure 12 using spherical joints 28 (28a, 28b, 28c, 28d, 28e, 28f). They are also connected with their top ends to the moveable structure 14 using spherical joints 26 (26a, 26b, 26c, 26d, 26e, 26f). The spherical joints 26, 28 may be build as a ball joint, cardan joint or Hooke's joint, a flexural mechanism etc. well known by skilled persons. (In this application the term "spherical joint" is used as a general term for all those different joints allowing more or less arbitrary spherical rotation like: flexural mechanism, ball joints, cardan joints or Hooke's joints etc.). Usually, as it is also shown in FIG. 1, each extendable leg 16 is connected with its bottom end pairwise—namely 16a and 16b, 16c and 16d, 16e and 16f—with the adjacent extendable leg arranged at its one side, while the same extendable leg 16 is connected with its top end pairwise with the adjacent extendable leg of its other side—namely 16a and 16c, 16b and 16f, 16d and 16e—, so that the leg pairs form triangles with a rim of the base structure 12 and a rim of the moveable structure 14, respectively.

Each telescopically extendable leg 16 comprises a drive means (motor and according mechanism, not shown), at least one sliding linear member 23 configured to slide along at least one stationary linear member 22—the stationary linear member is often a hollow member accommodating the sliding member—and an according number of linear encoders 24 measuring the relative displacement of the at least one linear sliding member 23 relative to the stationary linear member 22 or relative to further linear sliding members (not shown). The length of each extendable leg 16 is controlled by an associated controller (not shown) for each leg or a central controller 38 using the information generated by the linear encoder(s) 24 to control the drive means in a servo loop. A program for controlling the movement of the legs 16 and by this the movement of the movable structure 14 may be stored in an internal memory 39 connected to the controller. In preferred embodiments the controller 38 further includes an analysing unit 32.

Usually the linear members 22, 23 of a leg 16—also called leg-members—are made of a light material as aluminum, an aluminum alloy or plastics and in particular reinforced plastics comprising glass-fibres and/or carbon fibres. Also the movable structure 14 is usually made of a light but rigid material like the materials used for the leg-members, wherein the base structure 12, when it forms the bottom of the CMM to stand on, is often made of a more heavy material.

In use, an object 20—also called a workpiece 20—that is to be measured, is placed on the base structure 12 of the hexapod CMM 10. Optionally fixation means 18, like brackets, can be provided in order to fix the workpiece 20 to the base structure 12. Altering the length of the various legs 16 allows the moveable structure 14, and hence a probe 30 fixed to the movable structure 14, to be moved relative to the base structure 12 and the workpiece 20 with 6 degrees of freedom (6 DOF): 3 degrees of freedom regarding the lateral movement in the Cartesian-directions x, y, z and further 3 degrees of freedom regarding rotational movement around these Cartesian x-, y-, z-axis resulting in yawing, rolling, pitching. As a result the form of an workpiece 20 placed on the base structure 12 of such a hexapod CMM 10 can easily be measured by the probe 30 mounted to the movable structure 14 of said hexapod CMM 10 from different perspectives. Thereby, the moveable structure 14 and the extendable legs 16—including the movement options of the legs 16—define a working volume, the probe is moveable within said working volume. Results of the measurement of the probe 30 might be analysed in an internal control unit 38 and/or using an external control unit 36; wherein at least one of the controllers 38, 36 comprises an analysing unit 32. Data transfer within the CMM, i.e. between the linear encoders and the controller(s) or the memory 39 and the controller(s) or the probe 30 and the internal or external control unit, as well as to external units in general might be operated by wire 35 or wireless 37, i.e. by bluetooth, infra red, wlan etc. A further example of the same type of a hexapod CMM is given in U.S. Pat. No. 7,841,097 B2.

Figure 2:
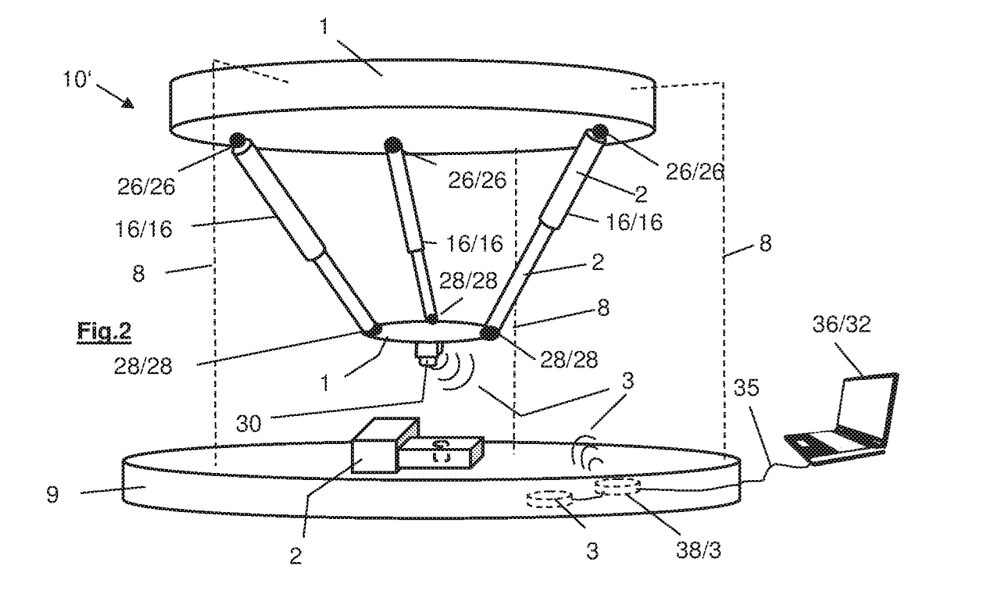
FIG. 2 a simplified form of a Non Cartesian CMM based on the same principals as the hexapod CMM of FIG. 1, but having only 3 extendable legs.

A slightly different example of a Non Cartesian CMM 10' is shown in FIG. 2. Despite of all differences (see below), the NCCMM 10' shown in FIG. 2 is based on the principals of the hexapod CMM described above for FIG. 1. It is therefore called a hexapod-like CMM. However, in this embodiment a bottom platform 9 carries the workpiece 20 and supports piles 8, which piles 8 (adumbrated by dashed lines) support the base structure 12 on their top in a fixed position. The movable structure 14 is arranged hanging from this top arranged base structure 12 on three (instead of six) extendable legs 16 (16a, 16b, 16c). A probe 30 is fixed to the hanging movable platform 14 directed towards the bottom platform 9 carrying the workpiece 20. The movable structure 14 with the probe 30 is movable relative to the bottom platform 9 and to the base structure 12, respectively, with 6 degrees of freedom (see above), by extension and contraction of the legs 16, so that the workpiece 20 on the bottom platform 9 can be measured from all sides and from all perspectives.

Independent on the concrete design of the hexapod CMM or hexapod-like CMM the telescopically extendable legs are formed as struts, most often in the form of an outer hollow tubular portion and at least one inner tubular portion, wherein each of the at least one inner tubular portions is slidable within the next outer hollow tubular portion. However, instead of hollow elements as leg-members it is also possible to design the struts and leg-members, respectively, in form of i.e. tongue-and-groove, dovetail guide, u-sections or a u-section and a t-section slidable against each other or sections with other cross sections suitable for sliding relative to each other.

The drive means may comprise any arrangement that introduces relative axial motion between a first leg-member and a second leg-member or even further leg-members and thus allows extension and contraction of the leg. For example, the drive means may be hydraulic, or may comprise a screw jack, a direct drive mechanism or an electronic drive arrangement including e.g. a friction drive like it is described in U.S. Pat. No. 5,604,593. Each of the six extendable legs of the hexapod CMM of U.S. Pat. No. 5,604,593 comprises in each case a tubular housing and a tubular ram member, which tubular ram member slides telescopically within the tubular housing driven by means of a friction drive. This friction drive comprises a motorised drive roller, and an opposing reaction roller, both of the rollers engage with the tubular ram member such that rotation of the motorised drive roller 54 extends the ram member from the tubular housing or retracts the ram member into the tubular housing.

While changing the length of the telescopically extendable legs the noise level of the spherical joints connecting the legs with the movable structure and with the base structure are often high. Further, due to lubrication misbalances friction effects and stick slip effects might be present. U.S. Pat. No. 5,604,593 suggests to build the spherical joints in form of air ball bearings, in order to avoid these disadvantages. Each of the six extendable legs is connected to the base structure and to the movable structure by an air ball bearing having a universally rotatable ball. In each case two of such air ball bearings are embedded in a connecting element. Thus, there are three connecting elements connecting the movable structure with the tubular ram members of the six legs and three further connecting elements connecting the base structure with the six tubular housings of the six legs. However, more details of the structure of the air ball bearings, i.e. the air supply system, the construction of the bearing housing etc. are not disclosed in U.S. Pat. No. 5,604,593.

But U.S. Pat. No. 5,604,593 does not only try to avoid the disadvantages of common spherical joints but also suggests to reduce the influence of load and vibrations on the measurement. For this purpose U.S. Pat. No. 5,604,593 suggests to measure the relative displacement of the moveable structure to the base structure not any more by a linear encoder integrated in the extendable legs, but to measure it by six tracking interferometers each comprising a light source, a retro reflector and a detection unit for detecting the light reflected by the retro reflector. The light sources and the detection unit are placed together at the base side, wherein the retro reflector is mounted linear opposite at the movable structure. The interferometers are mounted either within the hollow rams or beside the spherical bearings connecting the legs to the base structure and to the moveable structure. Each tracking interferometer tracks and measures the distance to its corresponding retro reflector and a computer control is enabled to calculate from the six linear measurements the obtained position and orientation of the moveable structure including position and orientation of the probe fixed to the moveable structure.

U.S. Pat. No. 7,841,097 B2 suggests a different strategy to eliminate the negative influences of load impacts, deflection by weight, inertia effects and vibrations during movement on the preciseness of the measurements. The hexapod NCCMM of U.S. Pat. No. 7,841,097 B2 discloses a hexapod CMM with a hexapod double structure: a load bearing hexapod structure including motor driven struts and a load bearing base structure and a load bearing movable platform. Further, and parallel to this load bearing hexapod structure a hexapod metrology structure is provided coupled with the load bearing structure. The metrology hexapod structure comprises a metrology base structure, a metrology moveable platform carrying the probe and extendable legs, expansion and contraction of these legs are operated by the motor driven struts of the load bearing parallel hexapod structure. According to the discloser the metrology moveable platform is connected to the parallel load bearing moveable platform, the metrology base structure is connected to load bearing base structure and the metrology legs are connected to the load bearing, motor driven struts in a way that no or very little load and no or very little vibrations are transmitted from the load bearing structure to the metrology structure. As set above, the metrology extendable legs are actuated in their extension and contraction by the load bearing extendable legs of the load bearing hexapod structure. The metrology extendable legs are provided with linear encoders in order to measure the relative displacement of their extendable and contractionable parts, respectively, without any influence of load deflection or motor/movement vibrations, which is carried solely by the load bearing legs. However the hexapod double structure is very expensive.

The proposed solutions of U.S. Pat. Nos. 7,841,097 B2 and 5,604,593 to avoid a high noise level, friction and stick-slip-effects connected with the spherical joints as well as a negative influence by inertia effects, vibrations, deflection by weight, are very complicated, expensive and lead to high maintenance and service costs and moreover may reduce the possible operation speed of the NCCMM.

SUMMARY

According to an aspect of the invention measuring speed as well as precision of the measurement of a hexapod CMM or hexapod-like CMM should be increased.

It will be appreciated that according to some aspects of the invention service efforts (service time, service interval and service expenses) and operation noise of a hexapod CMM or a hexapod-like CMM based on the principals of a hexapod can be reduced by using extendable legs with an air cushioning mechanism.

In some embodiments, a hexapod CMM or hexapod-like CMM, which is based on the principals of a hexapod as described above, has a base structure and a movable structure connected to each other by at least three telescopically extendable legs. The telescopically extendable legs are connected to the base structure and to the movable structure, respectively by spherical joints. Further each of the telescopically extendable legs comprises a linear first member and a linear second member having countersliding surfaces and are configured to slide linearly in relation to each other. It should be mentioned here that sliding might also include linear motion using linear roller bearings and other techniques known by a skilled person. A drive mechanism is endued driving the relative linear motion of the at least two linear members of each leg and a controller designed to control the relative movement of the first linear member and the second linear member of each leg in a servo loop. Each of the telescopically extendable legs has an air cushioning mechanism comprising an air supply system connected to at least one source of compressed air and having at least one air escape. The air escape is arranged in such a way that compressed air escaping the air escape flows into a gap between the countersliding surfaces of the at least two linear members of the leg cushioning the two linear members against each other. The air cushioning mechanism reduces transfer of bending errors caused by load or force misbalances and transfer of vibration from the base structure to the movable structure and thereby increases repeatability of measurement results and measurement precision. It reduces bearing noise and allows a higher moving speed. It thereby allows scanning measurement instead of point by point measurement. Thus the hexapod CMM or hexapod-like CMM might be integrated in a production line producing measurement "in-line" with the production.

In some embodiments, it should be emphasised here that the controller is an internal controller and/or an external controller, wherein the controller may include an analysing unit (e.g., computer).

In some embodiments, the gap between the countersliding surfaces of the at least two linear members either exists independent of the flow of the compressed air of the cushioning mechanism or the countersliding surface of at least one of the at least two linear members belongs to a bearing element which bearing element is spring mounted in such a way that the air flow escaping the air escape creates a gap between the countersliding surfaces of the at least two linear members by compressing the spring of the spring mounted bearing element. The spring of the spring mounted bearing element might be realised by a classic pressure spring, coil spring, disc spring or sheet spring or by the use of a permanent magnet and/or an electromagnet or a pneumatic cylinder or hydraulic cylinder.

In some embodiments, the cushioning mechanism comprises at least one sensor for measuring air pressure and/or air flow rate. It further comprises at least one pressure regulator for a manual control of the air flow. Thereby the sensor for measuring air pressure or may be integrated in the pressure regulator. In addition or alternatively to the one pressure regulator at least one controllable valve is provided in the air cushioning mechanism and the controller is designed to control the at least one controllable valve in a servo loop dependent on the detected air pressure and/or air flow rate.

In some embodiments, the source of compressed air is at least one out of the group comprising: an air compressor, a compressed air vessel, an air supply system of a facility. The air compressor and the air vessel may be part of the hexapod CMM or hexapod-like CMM or bay be separate from the hexapod CMM or hexapod-like CMM like the air supply system of the facility, wherein the facility is typically a laboratory.

In some embodiments, dependent on the structure of the hexapod CMM or hexapod-like CMM the air supply system of the air cushioning mechanism comprises at least one air supply channel (70) and or at least one air hose (71) and further an air distribution system (72, 73, 74). The air distribution system (72, 73, 74) of the air supply system comprises at least the one air escape mentioned above but further may comprise an air ring channel and an air supply pipe.

In some embodiments, in order to enable the linear members of the telescopically extendable legs to slide linearly in relation to each other, the linear members of the leg have a guiding structure guiding the linear members relative to each other along their axial extension, i.e. the first linear member is a hollow member, designed to accommodate a body of the linear second member in such a way that it allows a relative, linear movement of the first linear member and the second linear member, whereby the cross-section of the hollow first linear member and the according body of the second linear member may be circular, oval, triangular or polygone.

In some embodiments, instead of being a hollow member and an according body the leg-members may also be connected to each other such that they are dovetail guided slidable against each other or in form of a tongue-and-groove, or are designed in form of i.e. u-sections slidable against each other, or in form of a u-section and a bar slidable against each other, or as a u-section and a t-section meshing, or sections with other cross sections suitable for sliding relative to each other.

In some embodiments, the air cushioning mechanism comprises beside the at least one air escape leading the air flow into the gap between the two leg-members at least one air outlet. Thus the air cushioning mechanism is based on an air flow. The air flow further increase measurement precision as less thermal effects occur because of the cooling effect of the air flow. Further abrasion particles are "washed" away by the air flow and humidity and dust from outside are prevented to enter or if it had entered it is dragged out as well.

In some embodiments, the air cushioning mechanism is endued with at least one controllable valve and a controller designed to control the at least one valve in a servo loop, so that a controlled air flow between the air escape and an air outlet is realisable. Preferably groups of air escapes are connected with a controllable valve or even better each air escape is provided with a controllable valve.

In some embodiments, a further advantage might be achieved if one or more air pressure sensors and/or one or more air flow rate sensors are integrated in the air cushioning mechanism. Using those sensors allows for a detection of leakage and blockage within the air cushioning mechanism. Further the controller in such a case can control the controllable valve(s) in a servo loop dependent on the detected air pressure and/or air flow rate.

In some embodiments, the first linear member is a hollow member and the second linear member has a body accommodated slidably within the hollow first linear member. The hollow first linear member comprises bearing rings or a bearing sleeve for guiding the linear movement of the second linear member and its body, respectively. The inner surface of the bearing rings or a bearing sleeve facing the surface of the linear second member and its body, respectively, form the countersliding surface of the first linear member whereas the outer surface of the linear second member and its body, respectively, form the countersliding surface of the second linear body. A plurality of air escapes are distributed along the inner surface of the bearing rings or the bearing sleeve of the first linear body. Preferably the air escapes are equally distributed, wherein equally distributed means either equally in axial rows and/or equally along the circumferential.

In some embodiments, the hollow first linear member comprises a surrounding wall, the inner surface of which forms the countersliding surface of the first linear member, and which surrounding wall guides the linear movement of the second linear member. A plurality of air escapes are distributed along the inner surface of the surrounding wall, wherein the distribution of the air escapes again is preferably equal in axial rows and/or along the circumferential.

In some embodiments, a magnetic force arranged in the region of the gap between the at least two linear members and is provided by at least one electro magnet or at least one strong permanent magnet. Said magnetic force holds the at least two linear members together against gravity, inertia and the forces of the cushioning air flow of the air cushioning mechanism. The at least one electro magnet and the at least one permanent magnet, respectively, are designed as single magnet, a plurality of magnets or a magnetic layer covering at least a part of the surface facing the gap.

In some embodiments, each leg is endued with a distance measurement unit for measuring the distance between the countersliding surfaces of the at least two linear members or between a surface of the first linear member and a surface of the second linear member facing each other in the gap. The surface of the first linear member is thereby is the inner surface of the surrounding wall, or the inner surface of at least one of the bearing rings or the inner surface of the bearing sleeve directed towards the second linear member. The distance measurement unit comprises at least two distance measurement sensors arranged at the same axial level in relation to the longitudinal axis of the leg and in an angle of 90°±25° to each other and around the longitudinal axis of the leg. Based on the data derived by the distance measurement unit irregularities of the system can be detected, particularly relative tilting of the axis of the linear members of the leg and/or irregularities in the air flow of the air cushioning mechanism.

In some embodiments, the distance measurement unit comprises at least two distance measurement sensors at a first axial level in relation to the longitudinal axis of the leg and at least two further distance measurement sensors at a second axial level in relation to the longitudinal axis of the leg, wherein the two axial levels are arranged in axial distance to each other, and wherein each two distance measurement sensors of the same axial level are arranged in an angle of 90°±25° to each other and around the longitudinal axis of the leg (15). In addition of a tilting even a relative bending of the linear members of the leg can be detected by a distance measurement unit like this.

In some embodiments, a less expensive alternative— enabling more or less only detection of a tilt—is the use of a tilt sensor.

In some embodiments, as distance measurement sensors capacitive sensors, short distance optical sensors or IMUs (1 dof up to 9 or even more dofs), tilt sensors, hall sensors, eddy current sensors etc. may be used. In a preferred embodiment the distance measurement sensors are laser interferometers.

By using distance measurement units as described above, load misbalances and/or force misbalances are detectable.

In some embodiments, when the hexapod CMM or hexapod-like CMM is configured with a distance measurement unit the controller of the hexapod CMM or hexapod-like CMM is preferably designed to detect those irregularities, like load misbalances and/or force misbalances and/or leakages/blockages in the air cushioning mechanism.

It will be appreciated that in embodiments where the air cushioning mechanism comprises at least one controllable valve per leg, at least one air pressure sensor and/or at least one air flow rate sensors and/or a distance measurement unit (80) per leg, the controller—external or internal—is designed for detecting irregularities like load misbalances and/or force misbalances and/or leakages/blockages in the air cushioning mechanism based on the data measured by the at least one pressure sensor and/or the at least one air flow rate sensor and/or the distance measurement unit. Furthermore the controller is preferably designed for not only detecting but also correcting such irregularities by controlling the at least one valve per leg in a servo loop and/or it is designed for giving a warning output or to initiate an emergency stop if the measured irregularities increase over a predetermined threshold.

In some embodiments, in order to further smooth and damp the movement of the movable structure of the hexapod CMM or hexapod-like CMM, the spherical joints are formed as air ball bearings with balls seated in ball bearing shells, wherein each of the balls slides on an air flow arranged between the ball and the bearing shell. This reduces further stick-slip-effects and the noise of the hexapod CMM or hexapod-like CMM during the measurement and increases further the measurement precision.

In a further development of this embodiment the ball in the air ball bearing is hold within the bearing shell by a magnetic force. The magnetic force may be produced by a strong electro magnet or a strong permanent magnet. Thereby means "strong" in the term "strong permanent magnet" that the magnetic force is chosen in relation to the forces, which assembly will be effective in the according joint. However, the magnetic force will be at any time be chosen at least strong enough to hold the ball in the bearing shell. The magnet may be a single magnet or a plurality of magnets or a magnetic layer covering the surface of the bearing shell.

In some embodiments, the second linear member is a hollow structure and a weight balance body is arranged within the hollow body of said hollow linear member. The second linear member is preferably arranged at the top of the hexapod CMM or hexapod-like CMM. The weight balance body by use of a mounting suspension is fixed to the top structure of the hexapod CMM or hexapod-like CMM, i.e. to the top arranged movable structure or the top arranged base structure, i.e. via the top spherical joint. The weight balance body is air buffered in the hollow leg-member, whereby the air buffer is created by an air flow loading the mounting suspension with a tension force. The length of the mounting suspension and the strength of the air flow are chosen dependent on the own weight and the predicted forces that will be effective in such a way that the balance point of the extended leg is shifted in an advantageous position, so that the risk of bending of the extended legs and its linear members respectively, is reduced.

Particular further embodiments and further developments are given in the dependent claims.

BRIEF DESCRIPTION OF THE DRAWINGS

The invention of some of the embodiments will be explained in greater detail below with reference to examples of possible embodiments. Same elements in the figures are indicated by the same index numbers. It should be understood that the drawings are diagrammatic and schematic representations of such example embodiments and, accordingly, are not limiting the scope of the present invention, nor are the drawings necessarily drawn to scale. The drawings show schematically:

FIG. 3 to 9 various examples of extendable legs for a Non Cartesian CMM each with an air cushioning mechanism.

DETAILED DESCRIPTION

As stated above FIG. 1 presents an example of a Non Cartesian CMM 10 in form of a typical hexapod CMM with six extendable legs 16; FIG. 2 presents an example of a simplified form of a Non Cartesian CMM 10' based on the same principals as the hexapod CMM of FIG. 1, but having only 3 extendable legs 16 and a hanging movable structure 14, so that this NCCMM is called a hexapod-like CMM.

The present invention relates to hexapod CMM as well as to hexapod-like CMM and related NCCMM based on the principals of a hexapod (the latter ones should be included in the term "hexapod-like CMM").

According to the invention measuring speed as well as precision of the measurement of such a hexapod CMM and hexapod-like CMM can be increased, while service efforts (service time, service interval and service expenses) and operation noise of such an NCCMM 10, 10' can be reduced using extendable legs 15 with an air cushioning mechanism 1.

Figure 3:
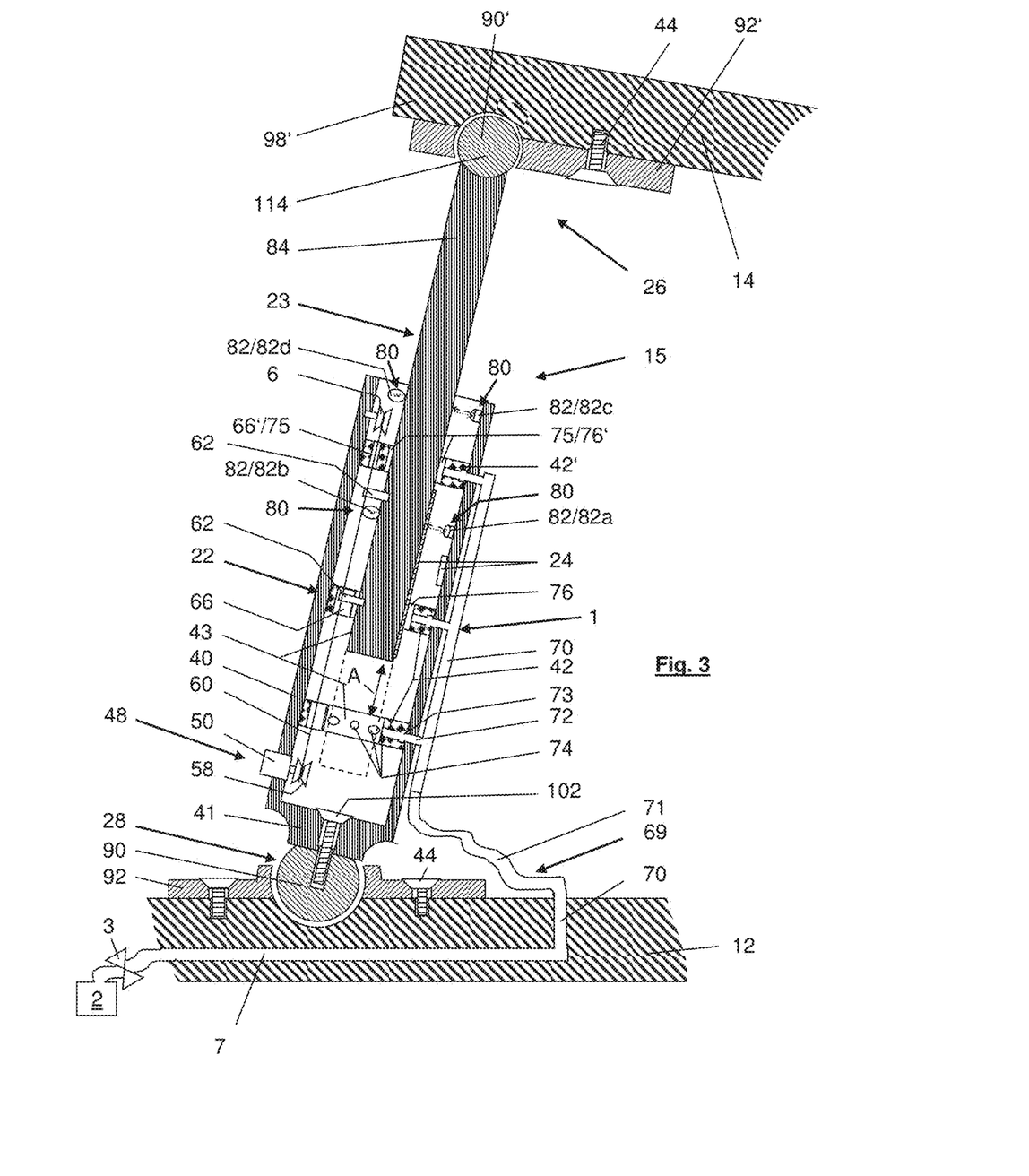
Figure 4:
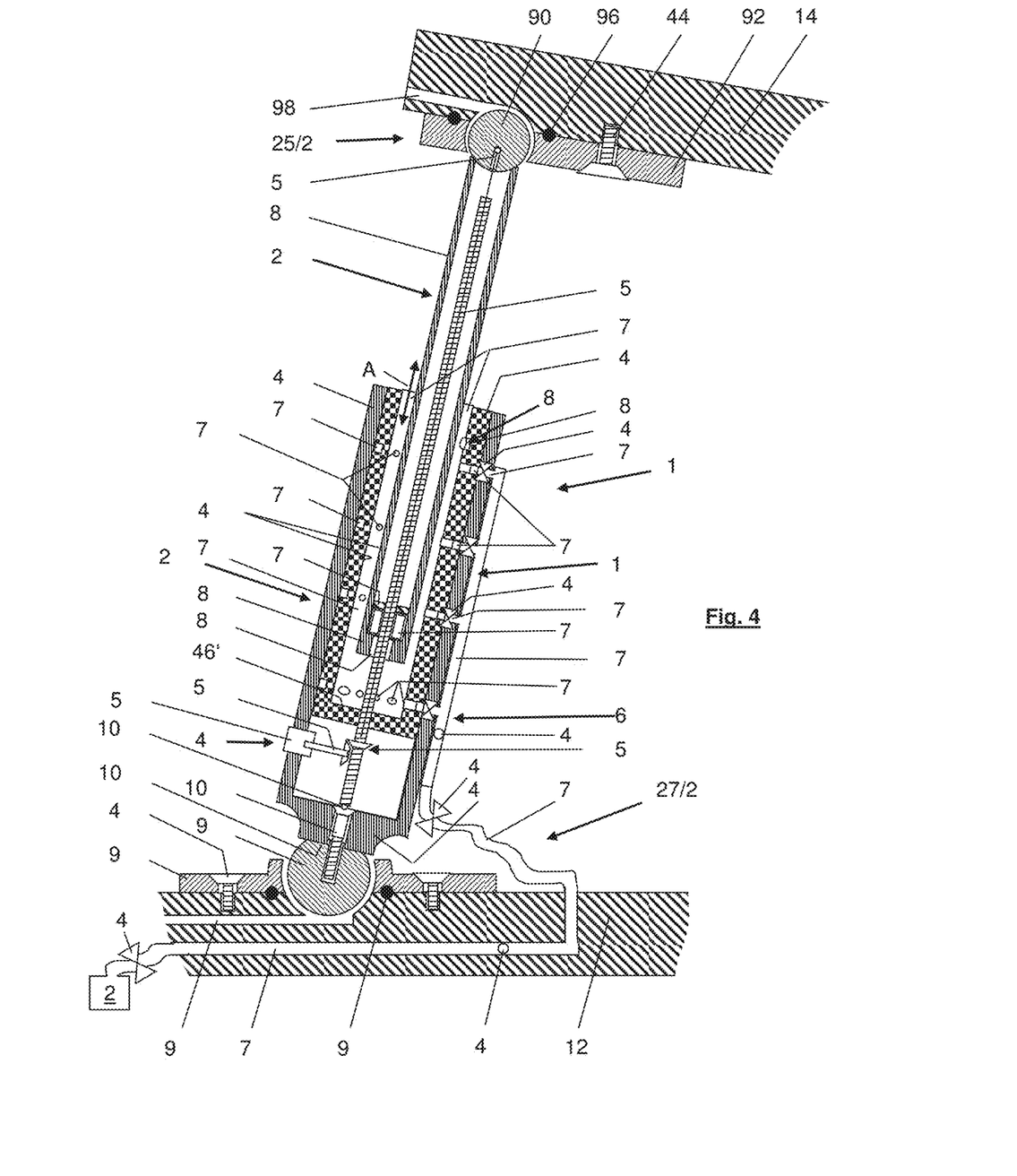
Figure 5:
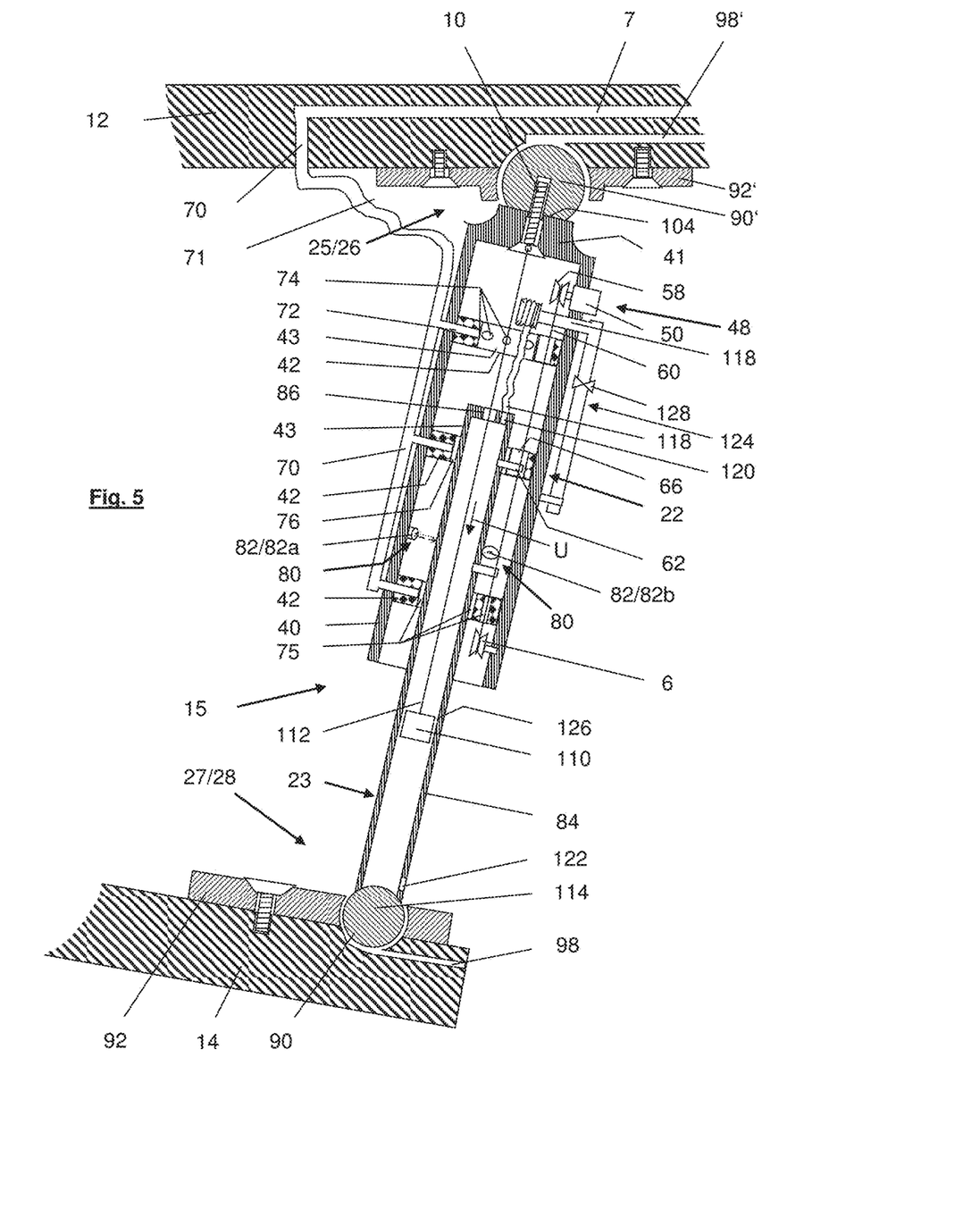
Figure 6:
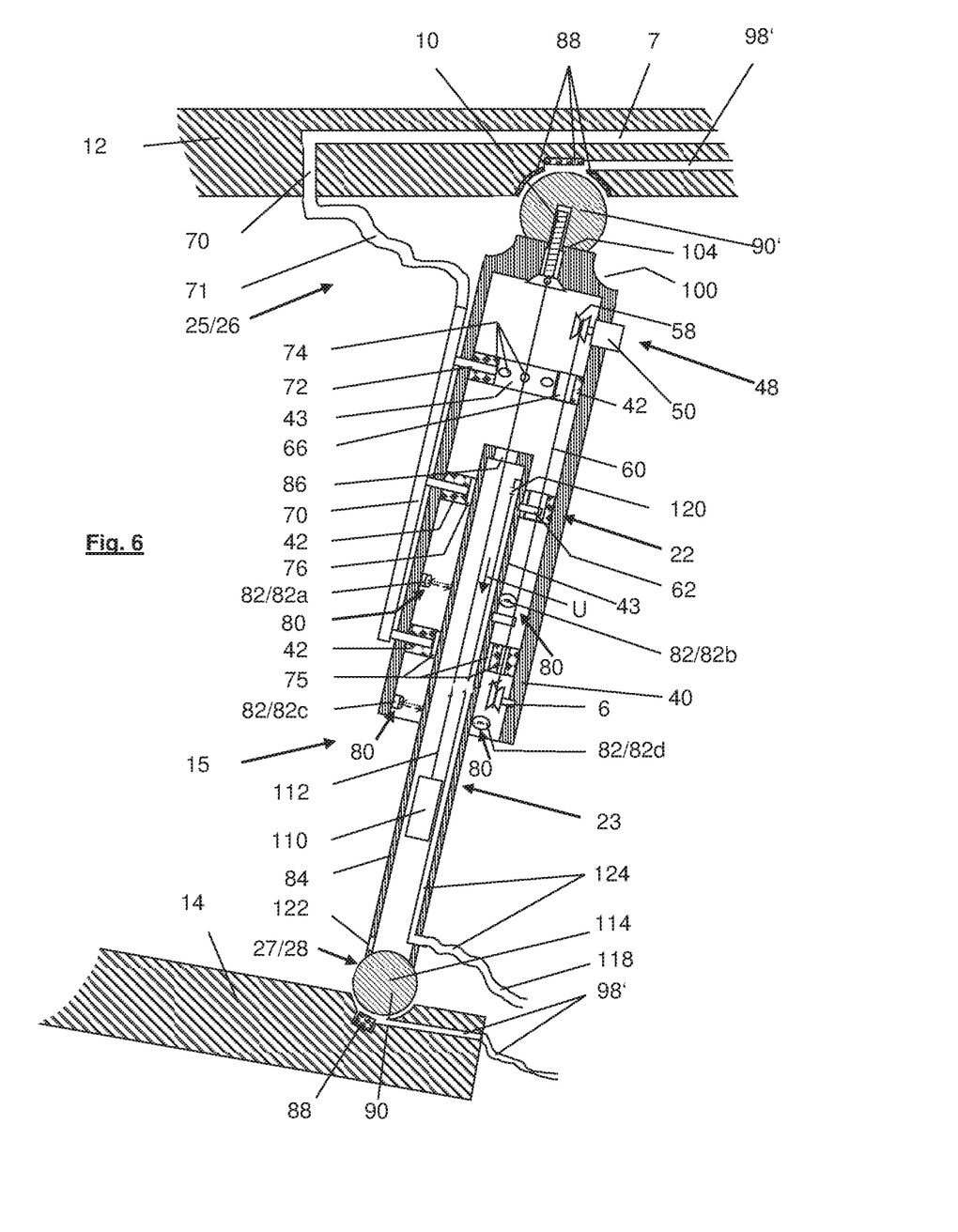
Figures 8A, 8B, 8C, 8D, 9:
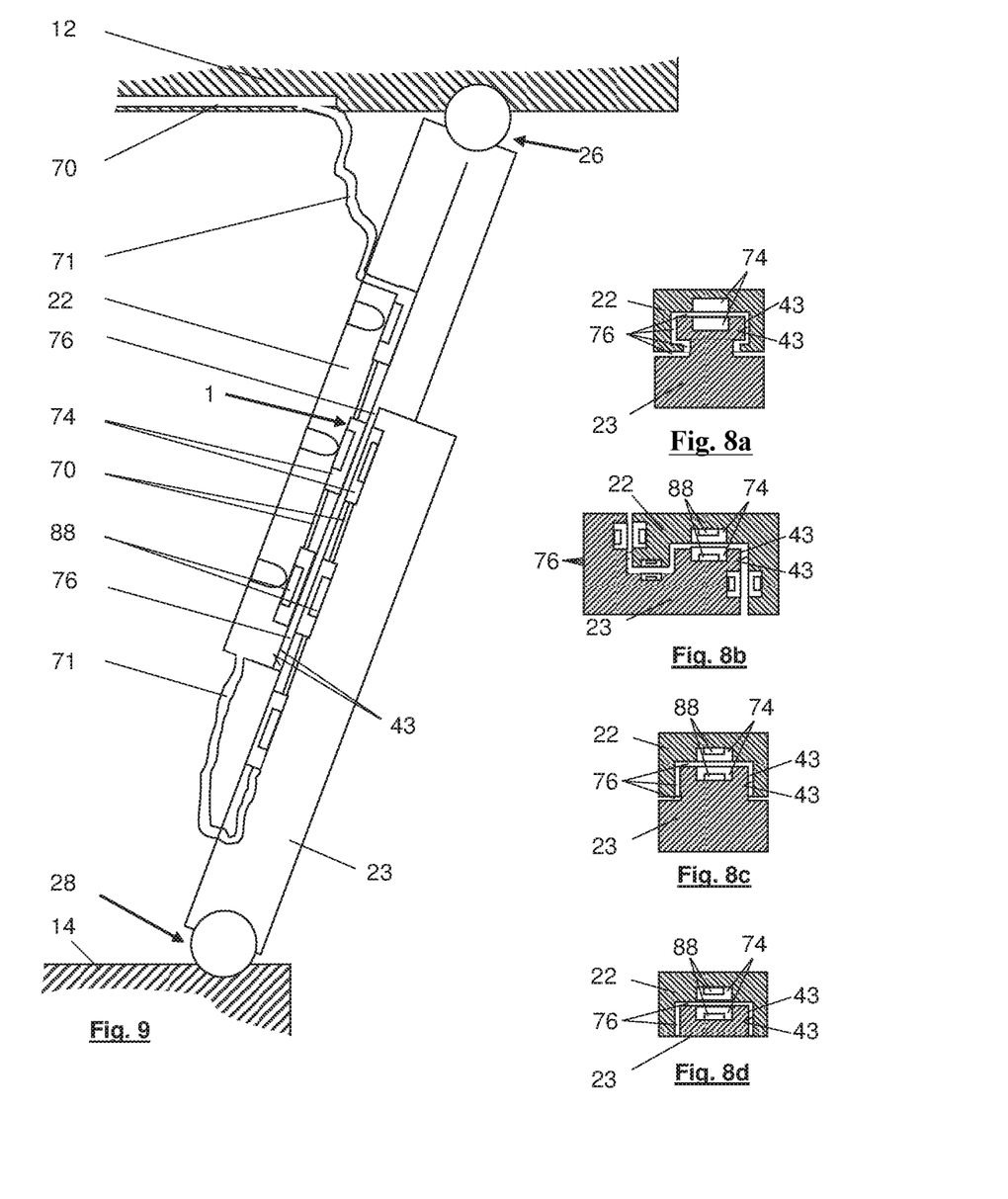

FIGS. 3 to 9c each show an example of such an extendable leg 15 with an air cushioning mechanism 1, wherein FIGS. 3 and 4 each presents a leg 15 joint with its bottom end to a supporting base structure 12 and joint with its top end to a movable structure 14, analogous to the structure of the NCCMM of FIG. 1; FIGS. 5, 6 and 8 each presents a leg 15 joint with its top end to a supporting base structure 12 in a hanging manner, and joint with its bottom end to a movable structure 14, which movable structure 14 accordingly hangs on the leg 15 (the base structure 12 might be supported by piles arranged on a base plate (not shown in FIGS. 5, 6 and 8)) analogous to the structure of the NCCMM of FIG. 2.

The extendable leg 15 presented in FIG. 3 is connected with its bottom end to the base structure 12 by a spherical joint 28 and at its top end it is connected to the movable structure 14 by another spherical joint 26. Both of these spherical joints 26, 28 are in this example conventional ball bearings with a bearing ball 90, 90' spherically seated in a bearing shell—also called bearing seat—wherein part of the bearing shell is integrated in the base structure 12 and the movable structure 14, respectively, and part of the bearing shell is integrated in a screw 44 fixed housing 92, 92'. It might be appreciated that the spherical joints 26, 28 may also be Hooke's joints or other suitable spherical joints as known by a skilled person.

The leg 15 presented in FIG. 3 comprises a first linear member 22 and a second linear member 23. In this embodiment the first linear member 22 is hollow with a surrounding wall 40, which in this embodiment is cylindrical and has a bottom 41 closing the cylinder at its bottom side. The bottom 41 is fixed to the ball 90 of the bottom ball bearing 28. In this example the bottom 41 of the surrounding wall 40 is fixed by a screw 102 to the ball 90 but any other suitable fixation is also possible like welding etc., even a construction with an integrated ball at the bottom (hollow cylinder 40, bottom 41 and ball 90 are formed as one piece) is imaginable.

The second linear member 23 has a body 84, which in the example of FIG. 3 is a massive body of a light weight material like an aluminum alloy or plastics, in particular reinforced plastics. It also can be made of a light weight structure like a honeycomb structure or the like or a hollow structure like in FIGS. 4 to 6.

The hollow first linear member 22 is designed to accommodate the second linear member 23 such that it is linear movable within the first linear member 22 driven by a driving mechanism 48. For this purpose—in this example—three bearing rings 42, 42' are arranged inside the hollow first linear member 22 in axial distance to each other. Dependent on the length of the linear members and the possible relative movement one, two, three or even more bearings rings are suitable. In general at least one bearing ring 42 is suitable, but two bearing rings 42 are advantageous. The bearing ring(s) 42 guide the movement of the second linear member 22 within the first linear member 22 in its/their approximate middle.

The driving mechanism 48 in this example comprises a driving motor 50 arranged in the bottom part of the leg 15. The motor 50 drives a drive roller 58, wherein the drive roller 58 is arranged within the hollow first linear member 22 having its rotation axis perpendicular oriented to the longitudinal axis of the first linear member 22. The drive roller 58 drives a drive belt or cable 60. The cable 60 is seated on one hand on the drive roller 58 on the other hand on a idler pulley 64, which idler pulley 64 is arranged in an axial distance of the drive roller 58 and in this example in the top end region of the first linear member 22 of the leg 15; the rotation axis of the idler pulley 64 having the same orientation as the drive roller 58. The second linear member 23 comprises a body 84 and at least one gripper 62 protruding radially from said body 84. In the example of FIG. 3 two grippers 62 are shown, but dependent on the distance between the drive roller 58 and the idler pulley 64 one, two or even more grippers might be suitable. The grippers 62 are arranged in an axial row so that the grippers 62 are enabled to grip the cable 60. The bearing rings 42 are wherever necessary endued with an according cable recess 66 for the free movement of the cable 60 and the grippers 62. As a result the second linear member 23 is movable outwardly and inwardly in relation to the accommodating hollow first linear member 22 by driving the drive roller 58 forward and backward/clockwise and counter-clock wise using the motor 50 and by this driving the cable 60—gripped by the grippers 62 of the second linear member 23—up and down.

The relative movement of the second linear member 23 to the first linear member 22 is measured by a linear encoder 24 and controlled as described for FIGS. 1 and 2 by an according controller. The linear encoder 24 converts the encoded position into an analog or digital signal, which can be decoded into a position by a read out or motion controller. The linear encoder 24 may be based on i.e. optical technologies, magnetic technologies, inductive technologies, capacitive technologies, eddy current or interferometric technologies; it may be either incremental or absolute. When using interferometric technologies, the laser beam can be send within or aside the extendable leg 15.

In order to obtain a smooth and more or less friction free movement of the second linear member 23 within the first linear member 22, the extendable leg 15 is endued with an air cushioning mechanism 1. The air cushioning mechanism 1 comprises at least one air supply system 69 connected to at least one source of compressed air 2. Thereby the source of compressed air 2 may be an external source or may be part of the air supply system 69 and/or the hexapod CMM or hexapod-like CMM, respectively. As an external source for compressed air 2 a house intern compressed air system might be used, like it exists in most laboratories. As an internal source for compressed air 2 an air compressor or a compressed air vessel may figure, which might or might not be integrated in the hexapod or hexapod-like CMM.

In the here presented embodiment of FIG. 3 the air supply system 69 further comprises an air supply channel 70, 71, which air supply channel 70, 71 includes at least one air channel 70 and where appropriate an air hose 71. It further comprises an air distribution system 72, 73, 74. The air supply channel 70, 71, distributes compressed air from the source of compressed air 2 to air supply pipes 72. The air further flows through the air supply pipes 72 into ring channels 73 and further through air escapes 74 into the hollow first linear member 22. In the presented embodiment the ring channels 73 are each integrated in the bearing rings 42 and are each connected upstream to at least one of the supply pipes 72 and downstream to at least one of the air escapes 74. However, it may be appreciated that the air ring channels 73 also may be integrated in the wall 40 of the first linear member 22 (not shown). The air escapes 74 are arranged radially between each ring channel 73 and the inner surface of each ring bearing 42. Advantageously a plurality of air escapes 74 are connected downstream to one ring channel 73 and are preferably equally distributed along the circumference.

The flow rate is usually manually controllable by the use of air pressure regulators 3 in connection with sensors measuring the air pressure (not shown). Instead or additionally to the air pressure the air flow might be measured. However, the air flow can also be controlled by using one or more air valves 4 (see FIG. 4) which is/are controlled in a servo loop dependent on the measured air pressure and/or air flow rate. According sensors for measuring/detecting airflow and/or air pressure (not shown) are located at different places within the air cushioning mechanism 1 of the extendable leg 15.

Further the measured air pressure (and/or measured air flow rate) might be used in order to detect a misbalance of forces and/or weight load in the NCCMM or in order to detect a leakage or blockage of the air supply system. The compressed air leaving the air escape 74 flows into a small gap 76 arranged between the bearing rings 42 and the body 84 of the second linear member 23. The gap 76 might be in the range of 10 micrometre to 1.5 millimetre. The air flow is ideally equal around the body 84 of second linear member 23 and holds the body 84 in the middle of the bearing rings 42. The compressed air escape the gap 76 and flows into the inner space of the hollow first linear member 22 from where it escapes via an air outlet 75 build by the uppermost gap 76' between the uppermost bearing ring 42' (situated at the free, open end of the hollow cylinder 40 of the first linear member 22) and the body 84 of the second linear member 23 as well as by the uppermost cable recess 66' in this uppermost bearing ring 42'.

Cushioned by the compressed air flow in the gap 76 the linear movement of the second linear member 23 within the first linear member 22 is less of friction except of air friction. Abrasion is therefore reduced compared with common linear joints and, as the compressed air is not only pressed into the inner space for dumping and cushioning the linear movement of the second linear member, but as the compressed air flows through the inner space of the first linear member 22 and leaves the first linear member by the air outlet 75, abrasion particles (which might be generated by the compressed air flow) are "washed"/dragged out of the linear joint by the compressed air flow. Dust, humidity and other impacts from outside are dragged away as well by said air flow. Thus maintenance of the system is reduced.

Further, a transfer of vibrations from the base structure 12 to the movable structure 14 is reduced, which improves the repeatability and the preciseness of the measurement.

In addition the air flow has a cooling effect, which might actively be used for temperature stabilizing in the whole NCCMM by control of air pressure/air flow rates.

By this measure temperature gradients might be homogenized or temperature might be held constant for a certain time period, so that transient effects might be smoothed out and temperature influences on the measurement results can be reduced.

As no lubrication and no stick-slip effects has to be considered, operation speed of the NCCMM can be increased and scanning measurement operations can be realised instead of having a measurement point by point. Thus, the over all throughput can be increased and the NCCMM might even be integrated in a production line.

Optionally a distance measurement unit 80 may be installed inside the hollow first linear member 22; which distance measurement unit 80 measures the distance between the inner surface of the surrounding wall 40 of the first linear member 22 and the body 84 of the second linear member 23. Based on a measurement of the distance between the wall 40 of the first linear member 22 and the body 84 of the second linear member 23 a bending of the leg 15 can be detected, which means that either the weight load and/or the effective forces in the NCCMM are not in balance and/or that there are imperfections of the air flow. Imperfections of the air flow means that the air flow does not hold the body 84 in the middle of the bearing rings 42, which might be the result of a leakage or blockage in the air supply system. The latter one can be verified by comparing the distance measurement results with the results of the air flow and/or the air pressure measurements in the system, which is done by the accordingly programmed control and analysing unit 38 of the system. In case the hexapod or hexapod-like CMM is provided with a plurality of controllable valves (see FIG. 4) the air flow may be controlled accordingly in an according servo loop or a warning or emergency stop may be realised.

The distance measurement unit 82 in this embodiment is very precise as it comprises four distance sensors 82 in form of four laser interferometers 82a, 82b, 82c, 82d. A first set of two laser interferometers 82a, 82b are arranged in axial distance of a second set of two laser interferometers 82c, 82d. At each axial level the two laser interferometer of this according level are arranged in an angle of about 90°±25° to each other. Thus deviation in the angular orientation of the body 84 relative to cylindrical wall 40 of the first linear member 23 as well as a relative bending of the body 84 of the second linear member 23 and the first linear member 23 are detectable and distinguishable. Such phenomena might be countered with a selectively controlled air flow, in case the air supply system is provided with further servo controlled valves 4 (like in FIG. 4), i.e. in front of each ring channel 73, or in case of having the ring channels divided in two half ring channels or even more frictions of a ring channel with according connection to the air supply system and endued with accordingly controlled valves by control of those valves. The half ring channels and the frictions of a ring channel, respectively, are arranged preferably in axial row along the leg 15.

It might be appreciated that also the air channels are presented in the figures as separate elements outside the first linear member 22 it is of course also possible to integrate the air channel and air pipes etc. within the wall 40 of the first linear member 22 (not shown).

The embodiment of the air cushioned leg 15 of FIG. 4 distinguishes from the one in FIG. 3 in that the first linear member 22 comprises a bearing sleeve 46 inside its cylindrical wall 40 instead of several bearing rings. In the presented example the bearing sleeve 46 has a bottom 46' sealing the inner space of the bearing sleeve 46 against the bottom part of the hollow first linear member 22, so that the inner space is loadable with compressed air using as less compressed air as possible. Further, the bottom 46' with its air sealing function leads to a directed air flow within the bearing sleeve 46 towards an air outlet 75 at the free end of the first linear member 22. However, the air cushioning mechanism 1 with the bearing sleeve 46 will work as well without said bottom 46'. Without the sealing bottom 46' the air flow will find an outlet at the bottom as well as at the free end of the first linear member. The air supply system 69 of the air cushioning mechanism 1 are the same as for the embodiment in FIG. 3, comprising a source of compressed air 2, an air channel 70, an air hose 71, air supply pipes 72, ring channels 73 at different axial levels (relative to the longitudinal axis of the first linear member 22) and preferably with several air escapes 74.

In an advantageous further development of the embodiment of FIG. 4 the valve control is configured in such a way as already described as an advantageous further development of the embodiment of FIG. 3. That means there are several sensors 45 for measuring air pressure and air flow rate, respectively, and that there are several controllable valves 4 installed, which are controllable in servo loop by an accordingly configured controller in dependence on the detected air pressure and air flow rate, respectively. As it is shown if FIG. 4 there is a main control valve near the source of compressed air 2 and further valves 4 for each of the ring channels 73.

In a preferred embodiment the valve control might be configured such that rings of air escapes 74 are blocked as soon as the body 84 of the sliding leg member 23 leaves the region of these air escapes 74 and that the blockage of these air escapes 74 is abolished as soon as the body 84 of the sliding leg-member 23 reaches the region of said ring of air escapes 74 again. By this measure the consumption of compressed air and energy can be reduced.

A person skilled in the art will understand that providing a plurality of controllable valves and configuring the control unit in a way as described for FIG. 3 in connection with misbalances in weight and load and leakages a/blockages of air flow as well as described in the paragraph before in connection with air consumption are independent of having bearing rings or a bearing sleeve.

The embodiment shown in FIG. 4 further distinguishes from the one in FIG. 3 in that it has in addition to the air cushioning mechanism 1 spherical joints 26, 28 that are formed as air ball bearings 25, 27. Again the ball 90, 90' of each of the ball bearings 25, 27 is seated in a bearing shell partly formed in the base structure 12 and the movable structure 14, respectively, and the other part of the bearing shell is integrated in a housing 92, 92', respectively, wherein the housing 92, 92' each is fixed by screws 94, 94' to the according structure 12, 14. Between each housing 92, 92' and its according structure 12, 14 a sealing 96, 96' is arranged in order to avoid air leakage between the housing 92, 92' and the structure 12, 14. The compressed air is supplied to each of the air ball bearings 25/26, 27/28 by an air supply channel 98, 98' and might be fed by a separate air source or the same air source that feeds the air cushioning mechanism 1. The air channels 98, 98' are preferably integrated in the according structure 12, 14, but may also be constructed as separate elements, i.e. air supply pipes or air supply hoses (not shown). During operation of the NCCMM air flows through the air channel 98, 98' such that the balls 90, 90' in the bearing shells are sliding on said air flow.

In this embodiment the first linear member 22 again is a hollow structure with a cylindrical wall 40 having a bottom 41 which is fixed by a fixing screw 102 to the ball 90 of the bottom ball bearing 27/28. The second linear member is in this example a hollow cylindrical structure as well and is fixed to the ball 90' of the top ball bearing 25/26 either by welding or by screwing the hollow structure with an internal thread onto an external thread realised at a part of the ball 90' (not shown).

In addition the driving mechanism 48 for the linear movement (double arrow A) of the second linear member 23 relative to the first linear member 22 is different as it is a spindle drive. The motor 50 again is situated in the bottom part of the first linear member 22 and is connected via its shaft 52 and a bevel gear 54 to a spindle 56. The spindle 56 is situated in the middle of the hollow first linear member 22. It is in this example rotatable fixed within the ball 90' of the top ball bearing 26 by a spindle fixation 57. Further it is rotatable fixed by a pin 106 or the like to the fixing screw 102, which fixes the first linear member 22 to the ball 90 of the bottom ball bearing 27/28. The spindle 56 reaches through a through hole in the bottom 46' of the bearing sleeve 46 and a through hole 86 in a bottom 85 of the hollow second linear member 23. In the bottom part of the hollow second linear member 23 a nut 78 is provided between the bottom 85 of the second linear member 23 and a ring flange 79 fixed to the body 84 of the second linear member 23 and having a through hole for the spindle 56. The nut 78 cooperates with the spindle 56 when the spindle 56 is driven by the motor 50 via the bevel gear 54. The flange 79 and the bottom 85 are serving as counter surfaces for the nut 78, so that the second linear member 23 is pushed up and down by driving the spindle 56 clockwise and counter clockwise. The relative movement of the two linear members 22, 23 is measured i.e. by using a linear encoder (not shown) as it is described for the embodiment of FIG. 3.

Preferably the inside of the second linear member 23 is connected to the air flow by the through hole in its bottom 46', so that the air cushioning effects are effective inside the hollow second linear member 23 as well.

A distance measurement unit 80 comprising two distance measuring sensors 82 arranged on the same axial level in an angle of 90°±25° to each other (only one is shown in the figure) allowing a measurement of the distance between the inner surface of the bearing sleeve 46 of the first linear member 22 and the body 84 of the second linear member 23, in order to detect load misbalances etc. (see above). In this embodiment the sensors 82 are realised using the outer surface of the body 84 of the second linear member 23 and the inner surface of the bearing sleeve 46, respectively. At the inner surface of the bearing sleeve a sensor element is fixed which allows to measure the gap between the mentioned surfaces at each time step in a precise way. The sensor element could be based on hall-sensor technology, on eddy current technology or on capacitive technology. It could be a PCB-board element which contains sensor elements and additional supporting electronics to generate a gap correlated sensor value. Having only sensors 82 on one single axial level makes the detection of misbalances cheaper, but it might—in case of a misbalance—not allow to distinguish so easily whether the ideal position of the body 84 in the middle of the bearing sleeve 46 is not obtained because of bending or tilting phenomena of one of the linear members 22, 23 relative to the other one. However, the spindle drive in this embodiment reduces the susceptibility for bending and tilting anyway.

As said before FIGS. 5 and 6 each presents an extendable leg 15 joint with its top end to a supporting base structure 12 in a hanging manner, and joint with its bottom end to a movable structure 14, which movable structure 14 accordingly hangs on the leg 15 analogue to the embodiment presented in FIG. 2. Relative linear movement of the two linear members 22, 23 of the leg 15 is again measured by a linear encoder (not shown as to avoid confusion). The principles of the air cushioning mechanism 1, of the bearing rings 42 and of the driving mechanism 48 are in both embodiments the same as described for the embodiment of FIG. 3. However, it might be appreciated that instead of the bearing rings 42 shown a bearing sleeve 46 like it is presented in the embodiment of FIG. 4 and the further developments, i.e. with a plurality of controllable valves etc. as described above are applicable as well. Further, other driving mechanisms, i.e. like a direct drive or a friction drive as it is described in U.S. Pat. No. 5,604,593, are applicable as well.

In any case the second linear member 23 in the embodiments of FIGS. 5 and 6 has a hollow body 84 and the spherical joints 25/26, 27/28 are build in form of air ball bearings 25, 27 as essentially described for the embodiment of FIG. 4. The hollow body 84 of the second linear member 23 is fixed with its bottom end to the ball 90 of the bottom ball bearing 27 in a manner as described above for its fixation to the ball 90' of the top ball bearing 25 in the embodiment of FIG. 4. The first linear member 22 again is a hollow structure and in the embodiments of FIGS. 5 and 6 it is fixed to the ball 90' of the top ball bearing 25 like it is described above with respect to FIG. 4 for its fixation to the ball 90 of the bottom ball bearing 27.

The embodiments of FIGS. 5 and 6 each are provided with a weight balance body 110 for balancing bending moments and other non-equilibrium of forces. The whole system with the weight balance body 110 as the main element is called here the weight balance system 116. The weight balance body 110 is arranged inside of the second linear member 23, or better, inside of the hollow body 84 of the second linear member 23. The weight balance body 110 is at one hand mounted via a mounting suspension 112 to the upper structure of the hexapod CMM or hexapod-like CMM, in particular in this embodiment to the screw 102, with which screw 102 the first linear member 22 is fixed to the ball 90' of the top air ball bearing 25. On the other hand the weight balance body 110 is supported by an air buffer created within the hollow body 84 by an air flow of compressed air directed (arrow U) from the mounting side (from the side of the screw 102) onto the balance body 110 in such a way that the mounting suspension 112 is held under tension force by said air flow.

The mounting suspension 112 is lead through a through hole 86, which is arranged in the front side of the free end of the hollow body 84 of the second linear member 23. It should be noted that the through hole 86 is only slightly larger in its cross section than the mounting suspension, in order to avoid a large leakage for compressed air. In the embodiment of FIG. 5 the compressed air for the weight balance system 116 is delivered bay an air supply system 124, which in the example of FIG. 5 is arranged outside of the stationary first linear member 22 in the upper region of the hexapod/hexapod-like CMM. The supply system 124 is connected to the inside of the second linear member 23 by an according feeding 118. The compressed air is fed through the feeding 118 and an air escape 120 into the hollow body 84 arranged in the region of the free end of the second linear member 23. At least one air outlet 122 is provided in the region, where the hollow body 84 of the second linear member 23 is fixed to the ball 90 of the bottom ball bearing 27/28, so that the weight balance body 110 is loaded by an compressed air flow directed (arrow U) from the through hole 86 to the ball 90. The air might flow further through a small gap 126 between the inner surface of the hollow body 84 and the weight balance body 110, so that the weight balance body 110 is prevented from touching this inner surface of the hollow body 84 even in the case of a tilt or bending of the extendable leg 15 or parts of it.

The compressed air is delivered by using a second air supply system 124, which may use the same source of compressed air as the air cushioning mechanism 1 or a separate source of compressed air. The second air supply system 124 delivers compressed air, which is adjusted so that the gravitational influence on the hollow body 84 are compensated for the movable structure 14, the applied sensors 30, further associated elements and for the gravity of the hollow body itself 84. That means that the weight influence at each leg is compensated proportionally. The air pressure within the hollow body 84 might be controlled by an according pressure regulator manually (not shown) or by an controllable valve 128 i.e. in a servo loop and in connection with an according sensor detecting the air flow rate and/or a sensor detecting the air pressure within the hollow body 84.

Again the gap 76 between the body 84 of the second linear member 23 and the bearing ring 42 and the bearing sleeve 46, respectively, is about 8 µm to 20 µm. The air bearing pressure in the gap 76 for the linear movement is higher than ambient pressure. Outside the gap 76 and outside the hollow body 84 room pressure prevails, i.e. also in the direct neighbouring of the through hole 86 outside of the hollow body 84 room pressure prevails.

The weight balance body 110 may be made of brass, steal or aluminum depending on the size of the hexapod CMM or hexapod-like CMM and depending on forces, which have to balanced by the weight balance body 110. The mounting suspension 112 is usually a wire made of steal. Once more it should be mentioned that the cross section of the outside of the hollow member 84 and the cross section of the inside of the first linear member are adapted to each other in a way that they build countersliding surfaces. The same applies of course for the cross section of the inside of the hollow body 84 and the according cross section of the weight balance body 110.

As can be seen in FIG. 5 the distance measurement unit 80 in this embodiment again has only two interferometers 82a, 82b as distance sensors at one single axial level. The interferometers 82a, 82b are arranged in an angle of 90°±25° at this axial level. This might deliver not as precise results as the distance measurement unit 80 of the embodiment in FIG. 3, but still might be suitable for certain purposes and is cost saving. It should be emphasised here that the cushioning mechanism 1 is operating also without having a distance measurement unit 80 although the examples presented here show such an distance measurement unit.

The weight balance system 116 with the weight balance body 110 in the example of FIG. 6 is mainly constructed in the same way as that of FIG. 5. However the air supply system 124 in FIG. 6 is integrated in the hollow structure of the second linear member 23 including a supply channel which is arranged within the hollow body 84 but may also integrated in the wall of the hollow body 84 (not shown). In contrary to FIG. 5, where the feeding 118 is arranged in the upper region of the hexapod CMM or hexapod like CMM, the feeding 118 in the example of FIG. 6 is arranged in the bottom region of the hexapod/hexapod-like CMM. The air escape 120 is again arranged in the region of the through hole 86, whereas the air outlet 122 is again in the region of the spherical bearing 27/28, so that the airflow is directed in a way that the weight balance body 110 is loaded with the air flow from the side where the mounting suspension 112 is fixed to the weight balance body 110 and in such a way that the mounting suspension 112 is under tension.

As said above the legs in the embodiments of FIGS. 5 and 6 are joint to the base structure 12 and the movable structure 14 by spherical joint 25/26, 27/28 build as air ball bearings 25, 27. However, the two embodiments of FIGS. 5 and 6 distinguish in the way their air ball bearings are realised:

The air ball bearings 25, 27 in the embodiment of FIG. 5 are air ball bearings (as described for FIG. 4) having a part of the bearing shell integrated in the according base structure 12 and movable structure 14, respectively; further having the opposite part of the bearing shell integrated in a housing 92, 92', which housing 92, 92' is screw mounted to the structure 12, 14 in order to hold the respective ball 90, 90' in place.

In contrary the air ball bearings 25, 27 of the embodiment of FIG. 6 are each operable without a housing 92, 92'. Again a first part of the ball shell is integrated for ball 90' of the top air ball bearing 26 in the base structure 12 and for ball 90 of the bottom air ball bearing 28 in the movable structure 14, but instead of holding the ball 90, 90' in place by a housing, the balls 90, 90' in this embodiment are hold within their ball shells of the base structure 12 and the movable structure 14, respectively by a magnetic preforce. The magnetic force might be provided by a strong permanent magnet 88' which might be a strong single magnet (not shown) or a layer of strong permanent magnets 88' covering the surface of part of the ball shell integrated in the according structure as it is shown in FIG. 6 for the top air ball bearing 25 and its shell integrated in the base structure 12. However, the magnetic force for holding the ball in its shell might also be provided by a strong electro magnet 88, which again might be a strong single magnet as shown in FIG. 6 for the bottom air ball bearing 27, or the electro magnet might be realised sleeve-like covering the surface of the shell (not shown) integrated in the according base structure or movable structure. Advantageously the electro magnet is controllable in a servo loop, so that the magnetic force can be controlled dependent on the air pressure (and/or air flow) measured in the air ball bearing and dependent on the forces (gravity, inertia) effective in the bearing, so that the ball is always well positioned in the part of the ball shell integrated in the according structure 12, 14. Having a magnetic force 88 instead of a housing which holds the ball in the part of the ball shell integrated in the according structure 12, 14, increases the rotation angle of member bearing mounted in the air ball bearing.

The distance between the two linear members is in the embodiment of FIG. 6 measured by distance measurement unit 80 with four distance measuring sensors 82a, 82b, 82c, 82d arranged at two different axial levels as already described above for the embodiment of FIG. 3.

Figure 7:
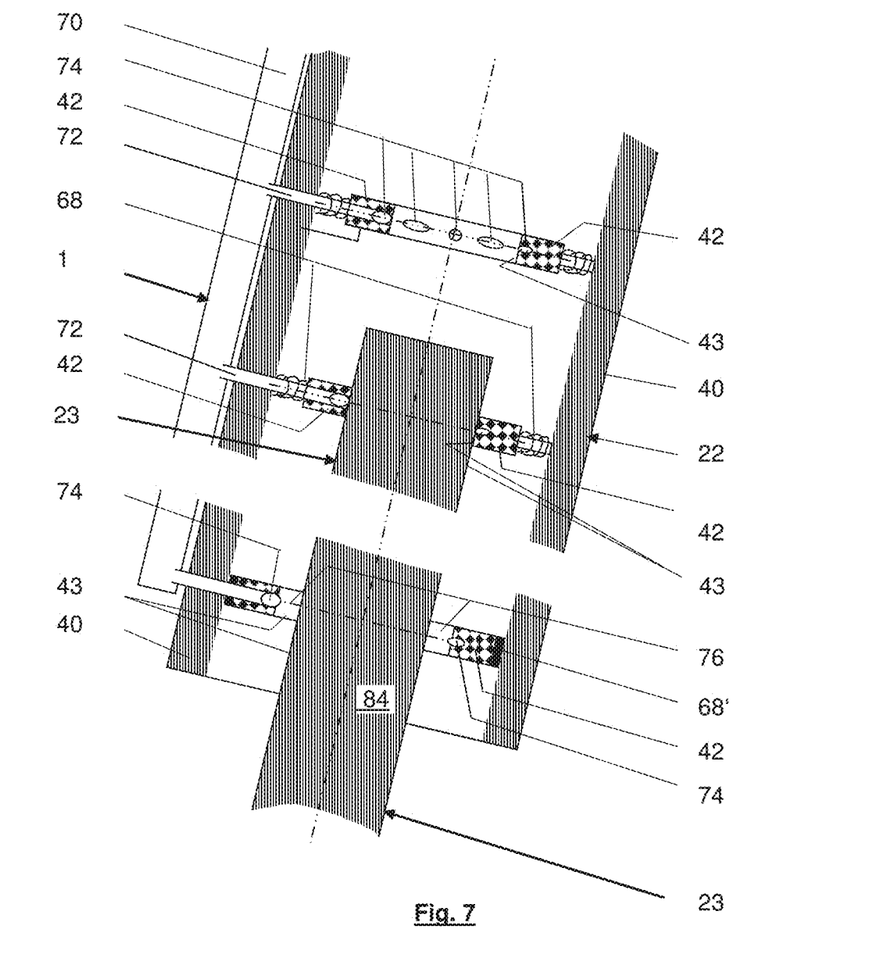

In a preferred embodiment the bearing rings 42 are constructed in a way that they can functioning as brackets for clamping the sliding second linear member 23 of the leg 15, when the air cushioning mechanism 1 is switched off. As presented in FIG. 7 the bearing rings 42 are mounted to the inner surface of the wall 40 of the first linear member by springs 68 (see springs 68 in the upper part of FIG. 7). In case the air cushioning mechanism 1 is switched of the spring force is large enough to clamp the sliding linear member 23, such that it is fixed in its position within the first linear member 22 and no extra mechanism and no extra energy has to be provided for fixing the sliding members in their position. On the other hand the air pressure is large enough that in case the air cushioning mechanism 1 is switched on, the springs are pressed against the inner surface of wall 40 (see spring 68' in the bottom part of FIG. 7) by the bearing rings 42 and clamping is "switched off" so that the sliding second linear member is again free slidable within the first linear member 22. As it has been mentioned before the linear members don't have to be hollow structures as presented in the previous figures. But, instead of hollow elements as leg-members 22, 23 it is also possible to design the struts and leg-members, respectively, in form of i.e. tongue-and-groove or dovetail guide (see FIG. 8a), or as u-sections (see FIG. 8b), or as a u-section and a t-section slidable against each other (see FIG. 8c), a u-section and a bar (see FIG. 8d), or sections with other cross sections suitable for sliding relative to each other.

In case as the two elements are fixed to each other in a direction other then the sliding direction, i.e. in case the elements are formed like tongue-and-groove or dovetail guide (see FIG. 8a), it is sufficient to have air escapes 74 arranged in a manner that the air flow through the air escapes 74 into the gap 76 between the first linear member 22 and the second linear member 23 creates an according air buffer, such that the elements 22, 23 can slide on this air buffer. Constructions where this is not the case, the air buffer is endued with a magnetic counter forces 88 like it is already described for the air ball bearing in FIG. 6. While various air cushioned legs 15 with leg members 22, 23 of different cross sections are presented in a cross sectional view in FIGS. 8a to 8d and FIGS. 8b to 8d show air cushioning mechanisms 1/74/76 with magnetic counter forces 88 FIG. 9 presents a side view of such an air cushioned legs 15 with an air cushioning mechanisms 1/74/76 with magnetic counter forces 88.

A skilled person will recognise that the hollow structure of the linear members 22, 23 of the leg 15, which is described above mainly as being cylindrical also may have a different cross section than circular, i.e. the cross section of such hollow structures may be triangular, oval, rectangular, quadratic, or polygonal, etc. Further not only two linear members but also three or more linear members of a leg may be arranged telescopically movable against each other supported by an air cushioning mechanism 1 as described above. A person skilled in the art can easily recognise, which elements—described and shown in the embodiments of FIGS. 1 to 6 and the according description above more or less only in connection with the elements of this specific embodiment—are also suitable to be combined with certain elements of other embodiments of the invention described and shown above in a way that makes sense. However, it is not possible to show and describe all possible combinations as a matter of space.

What is claimed is:
1. A Hexapod CMM or hexapod-like CMM based on a hexapod, having a base structure and a movable structure connected to each other by at least three telescopically extendable legs, comprising:
the telescopically extendable legs are connected to the base structure and to the movable structure by spherical joints,
the telescopically extendable legs comprise at least a first linear member and a second linear second member having countersliding surfaces and are designed in such a way that a relative, linear movement of the first linear member and the second linear member is enabled,
a drive mechanism driving the relative linear motion of the at least two linear members of each leg and a controller that is designed to control the relative movement of the at least two linear members of each leg in a servo loop,
wherein each of the telescopically extendable legs is a leg with an air cushioning mechanism, the air cushioning mechanism comprises:
at least one air supply system connected to at to at least one source of compressed air and having at least one air escape; and
the air escape is arranged in such a way that compressed air escaping the air escape flows into a gap between the countersliding surfaces of the at least two linear members of the leg cushioning the two linear members against each other.

2. The hexapod CMM or hexapod-like CMM according to claim 1, wherein:
either the gap exists between the countersliding surfaces of the at least two linear members independent of the flow of compressed air; or
the countersliding surface of at least one of the at least two linear members belongs to a bearing element which bearing element is spring mounted, wherein the spring of the spring mounted bearing element is realised by the use of at least one out of a coil spring, a disc spring, a sheet spring, a permanent magnet, an electromagnet, a pneumatic cylinder, a hydraulic cylinder.

3. The hexapod CMM or hexapod-like CMM according to claim 1, wherein the cushioning mechanism comprises at least one sensor for measuring air pressure and/or air flow rate and further comprises:
at least one pressure regulator for a manual control of the air flow; and/or
at least one controllable valve, and a controller designed to control the at least one valve in a servo loop dependent on the detected air pressure and/or air flow rate.

4. The hexapod CMM or hexapod-like CMM according to claim 1, wherein the source of compressed air is at least one selected from the group comprising: an air compressor, a compressed air vessel, an air supply system of a facility.

5. The hexapod CMM or hexapod-like CMM according to claim 1, wherein:
the at least two linear members are designed in such a form that they are dovetail guided slidable against each other, or in form of tongue-and-groove slidable against each other, or in form of a u-section and a bar slidable against each other, or in form of two u-sections meshing, or as a u-section and a t-section meshing, or in form of sections with any other cross sections suitable for sliding relative to each other.

6. The hexapod CMM or hexapod-like CMM according claim 1, wherein:
the first linear member is a hollow member designed to accommodate in a linear slidable way a body of the linear second member,
the first linear member comprises as a bearing element either a bearing sleeve or at least one bearing ring, the inner surface of which is the countersliding surface of the first linear member, and
a plurality of air escapes are distributed along the inner surface of the bearing ring(s) or the bearing sleeve, wherein the distribution of the air escapes is preferably equal in axial rows and/or along the circumferential.

7. The hexapod CMM or hexapod-like CMM according to claim 5, wherein:
the hollow first linear member comprises a surrounding wall, which guides the linear movement of the second linear member, wherein a plurality of air escapes are distributed along the inner surface of the surrounding wall, wherein the distribution of the air escapes is preferably equal in axial rows and/or along the circumferential.

8. The hexapod CMM or hexapod-like CMM according to claim 1, wherein:
a magnetic force is provided by at least one electro magnet or at least one strong permanent magnet arranged in the region of the gap between the at least two linear members, said magnetic force holds the at least two linear members together against gravity, inertia and the forces of the cushioning air flow of the air cushioning mechanism, wherein the at least one electro magnet and the at least one permanent magnet, respectively, are designed as single magnet, a plurality of magnets or a magnetic layer covering at least a part of the surface facing the gap.

9. The hexapod CMM or hexapod-like CMM according to claim 1, wherein:
each leg is endued with a distance measurement unit for measuring the distance between the countersliding surfaces of the at least two linear members or between a surface of the first linear member and a surface of the second linear member facing each other in the gap, and
the distance measurement unit comprises at least two distance measurement sensors arranged at the same axial level in relation to the longitudinal axis of the leg and in an angle of 90°±25° to each other around the longitudinal axis of the leg; or
the distance measurement unit comprises at least two distance measurement sensors at a first axial level in relation to the longitudinal axis of the leg and at least two further distance measurement sensors at a second axial level in relation to the longitudinal axis of the leg, wherein the two axial levels are arranged in axial distance to each other, and wherein each two distance measurement sensors of a certain axial level are arranged in an angle of 90°±25° to each other around the longitudinal axis of the leg.

10. The hexapod CMM or hexapod-like CMM according to claim 1, wherein the spherical joints are air ball bearings with balls seated in ball bearing shells, wherein the ball slides on an air flow arranged between the ball and the bearing shell.

11. The hexapod CMM or hexapod-like CMM according claim 1, wherein the controller is designed to detect load misbalances or force misbalances based on the measured data of the distance measurement units in the legs.

12. The hexapod CMM or hexapod-like CMM according to claim 11, wherein: the controller is designed for correcting irregularities like load misbalances and/or force misbalances and/or leakages/blockages in the air cushioning mechanism by controlling at least one controllable valve per leg in a servo loop and/or that the controller is designed for giving an warning output or to initiate an emergency stop if the measured irregularities increase over a predetermined threshold.

13. The hexapod CMM or hexapod-like CMM according to claim 1, wherein the controller is an internal controller and/or an external controller and that the controller in particular comprises an analysing unit.

14. The hexapod CMM or hexapod-like CMM according to claim 1, wherein the driving mechanism is a spindle drive or a drive belt mechanism or a direct drive mechanism.

15. The hexapod CMM or hexapod-like CMM according to claim 1, wherein the second linear member is a hollow structure and a weight balance body is arranged within the hollow body of the second linear member, wherein the weight balance body is fixed to the upper structure of the hexapod CMM or hexapod-like CMM by use of a mounting suspension and is further supported by an air buffer created within the hollow structure of the second linear member by an air flow of compressed air, in such a way that the mounting suspension is held under tension force by said air flow.

16. The hexapod CMM or hexapod-like CMM according to claim 1, wherein the hexapod CMM is integrated in a production line.

17. The hexapod CMM or hexapod-like CMM according to claim 10, wherein the ball in the air ball bearing is hold within the bearing shell by a magnetic force, the magnetic force is caused by an electro magnet or a strong permanent magnet, wherein the electro magnet and the permanent magnet, respectively, are designed as single magnet, a plurality of magnets or a magnetic layer covering the surface of the bearing shell.

* * * * *